US007251500B2

(12) United States Patent
Nakagawa et al.

(10) Patent No.: US 7,251,500 B2
(45) Date of Patent: Jul. 31, 2007

(54) MICROPROCESSOR AND MOBILE COMMUNICATION TERMINAL

(75) Inventors: Tetsuya Nakagawa, Koganei (JP); Katsuhiko Ishida, Higashimurayama (JP); Akira Naito, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 366 days.

(21) Appl. No.: 10/806,375

(22) Filed: Mar. 23, 2004

(65) Prior Publication Data

US 2005/0012811 A1 Jan. 20, 2005

(30) Foreign Application Priority Data

Mar. 28, 2003 (JP) ............... 2003-089526

(51) Int. Cl.
*H04M 1/00* (2006.01)
*H04N 7/14* (2006.01)
(52) U.S. Cl. ............... 455/556.1; 455/550.1; 455/556.2; 348/14.01
(58) Field of Classification Search .. 348/14.01–14.05; 455/14.07, 14.13, 14.14, 14.15, 390.1, 424.2, 455/425.4, 430.1, 431.1, 515, 523, 525, 556.1–556.2, 455/566, 41.2, 66.1, 550.1, 557–558, 418, 455/517, 552.1, 553.1; 379/102.03, 110.01
See application file for complete search history.

(56) References Cited

U.S. PATENT DOCUMENTS 4,356,509 A * 10/1982 Skerlos et al. ............ 348/552

| | | | |
|---|---|---|---|
| 5,640,427 A | 6/1997 | Rainish | 375/329 |
| 5,790,532 A * | 8/1998 | Sharma et al. | 370/286 |
| 5,847,752 A * | 12/1998 | Sebestyen | 348/14.12 |
| 6,198,752 B1* | 3/2001 | Lee | 370/395.65 |
| 6,714,233 B2* | 3/2004 | Chihara et al. | 348/14.02 |
| 6,909,453 B2* | 6/2005 | Mochizuki et al. | 348/14.1 |
| 7,092,735 B2* | 8/2006 | Osann, Jr. | 455/556.1 |
| 2002/0051074 A1* | 5/2002 | Kawaoka et al. | 348/376 |
| 2002/0052222 A1* | 5/2002 | Suzuki | 455/566 |
| 2002/0058531 A1* | 5/2002 | Terasaki et al. | 455/556 |

FOREIGN PATENT DOCUMENTS

| JP | 8-37546 | 2/1996 |
|---|---|---|
| JP | 2002-152626 | 5/2002 |

* cited by examiner

*Primary Examiner*—Meless Zewdu
(74) *Attorney, Agent, or Firm*—Miles & Stockbridge P.C.

(57) ABSTRACT

A microprocessor used in a pair with a baseband processor for performing the baseband processing, is provided with a central processing unit for calculation processing, a counter capable of measuring time in the calculation processing by the central processing unit, and an interface which enables the baseband processor to read the counter. By making the baseband processor read the counter, the processing by the baseband processor is synchronized with the processing by the central processing unit in the microprocessor. Consequently, it is possible to establish synchronization between video and voice when the video processing and the voice processing are separately performed by different processors.

10 Claims, 8 Drawing Sheets

MICROPROCESSOR AND MOBILE COMMUNICATION TERMINAL

BACKGROUND OF THE INVENTION

The present invention relates to a microprocessor for use in a pair with a baseband processor for performing the baseband processing which enables exchange of information using radio waves and a mobile communication terminal including the same.

A mobile phone that is one example of the mobile communication terminal comprises a speaker for receiving a voice signal, a microphone for supplying a voice signal, a codec (coder/decoder), a baseband processor for processing an audio input signal and an audio output signal received by this codec and performing the baseband modem processing, and a radio frequency module connected to an antenna for transmitting and receiving the processed audio signal (for example, refer to Japanese Patent Laid-Open No. 8-37546).

Expectation toward a video phone is rising as an important application of the third-generation mobile phone market. In the video phone, received video information is reflected in user's eyes as a virtual image from the video information driving unit through imaging optics (for example, refer to Japanese Patent Laid-Open No. 2002-152626).

SUMMARY OF THE INVENTION

A mobile phone is provided with a microprocessor for processing image data from a camera module and voice from a microphone, separately from the baseband processor for performing the baseband modem processing, because high speed is required for video processing in a video phone. This microprocessor for processing the image data of video and its corresponding voice data is referred to as an application processor, for the sake of distinguishing it from the above baseband processor.

The application processor will perform the following processing.

When the power is turned on, the camera module starts transfer of the image data from that point and interrupts the application processor every time of finishing the transfer of the image data for one frame. The application processor activates a video compression program by using the above interruption signal and compresses the captured image data for one frame. This operation will be periodically repeated. The frame rate of an image to be compressed can be changed by thinning the captured image at proper intervals. Further, it transmits a start signal to the DMAC (Direct Memory Access Controller) for voice data transfer during the above interruption. This DMAC for voice data transfer starts transfer of voice data and generates an interruption every time of finishing the transfer of one block (generally 160 samples) that is the unit of compression processing). Scheduling of a voice compression program is periodically performed by using this interruption. The moving image compression and decompression and the voice compression and decompression are performed by using a DSP (Digital Signal Processor) included in the application processor. According to the above procedure,the frame boundary of the first image data can be aligned with the boundary of the first voice block, thereby establishing synchronization between the image and the voice.

In the protocol (3G-324M) with which a video phone terminal is compliant, although AMR (Adaptive Multi Rate) is standardized as a voice codec, this is the standard voice codec also in the third-generation mobile phone. The present inventor had took the above into consideration but found it uneconomical because two voice codecs having the same function have to be used in both the baseband processor and the application processor, when the application processor, provided separately from the baseband processor, as mentioned above, performs the video compression and decompression and the voice compression and decompression. So, by making all the voice processing performed by the baseband processor, a circuit for performing the voice processing may be eliminated from the application processor. This, however, requires adjustment of reproducing timing between video and its corresponding voice and some device for establishing synchronization between the video processed in the application processor and the voice processed in the baseband processor.

An object of the invention is to provide a technique for establishing synchronization between video and voice when the video processing and the voice processing are separately performed by the different processors.

The above and other objects and new features of the invention will be apparent from the following description and the accompanying drawings.

The outline of the typical example according to the invention disclosed here will be briefly described as follows.

Namely, a microprocessor combined with and used in a pair with a baseband processor for performing the baseband processing which enables exchange of information by using radio waves, is provided with a central processing unit for calculation processing, a counter for measuring time in the calculation processing by the central processing unit, and an interface which enables the baseband processor to read the counter.

According to the above, since the baseband processor can read the counter, the processing by the baseband processor can be synchronized with the processing by the central processing unit in the microprocessor. This enables synchronization between video and voice when the video processing and the voice processing are separately performed by the different processors.

It may be provided with a digital signal processor capable of compressing and decompressing the image data transferred from a camera module, and the central processing unit instructs the digital signal processor to start the compression or the decompression of the image data for one frame, according to an interruption signal taken in from the camera module, every time of finishing each transfer of the image data for one frame from the camera module, and resets the counter.

It may be provided with a memory for storing the voice data compressed by the baseband processor and taken in through the interface and the video data compressed by the digital signal processor. In this case, each of the voice data and the video data may have a data structure in which time information with a frame boundary of the video used as a reference is attached as a header for every unit of a predetermined block, thereby establishing synchronization between voice and video even in an off-line video mail. Further, also when the voice data and the video data have a structure of data length for a fixed time that in which the above both data are collectively handled by the unit of data synchronous with each other, synchronization can be established between voice and video in an off-line video mail.

The microprocessor used in a pair with the baseband processor, is provided with a command register capable of setting a command through the baseband processor, an address register capable of setting an address signal through the baseband processor, a data register capable of reading and writing data through the baseband processor, a command decoder for decoding the command set in the command register, and an address decoder for decoding the address signal of the address register. In the above microprocessor, the counter is selected according to the decode result of the address decoder and a path capable of transferring the stored information of the counter to the data register is selectively formed according to the decode result of the command decoder. This structure doesn't have to always connect the counter to the baseband interface, and therefore, the important resources of the baseband interface can be saved.

In the microprocessor used in a pair with the baseband processor, the central processing unit may instruct the digital signal processor to start the compression or the decompression of the image data for one frame, according to an interruption signal taken in from the camera module, every time of finishing each transfer of the image data for one frame from the camera module, reset the counter, set an information bit indicating that the interruption parameter is the reset of the counter, in the register of interruption parameter information, and transmit an interruption signal to the baseband processor. In this case, since the interruption is used instead of polling, the waiting time of the baseband processor can be assigned to another processing.

Further, a mobile communication terminal may be formed by the above constituted microprocessor and baseband processor.

For example, in a mobile communication terminal including the baseband processor for performing the baseband processing which enables exchange of information by using radio waves and an application processor combined with and used in a pair with the baseband processor, the application processor may comprise a central processing unit for calculation processing, a counter for measuring time in the calculation processing by the central processing unit, and an interface which enables the baseband processor to read the counter.

Here, it may further comprise a camera module for obtaining the video data and a digital signal processor capable of compressing and decompressing the video data transferred from the camera module. In this case, the central processing unit may instruct the digital signal processor to start the compression or the decompression of the video data for one frame, according to the interruption signal taken in from the camera module, every time of finishing each transfer of the video data for one frame from the camera module, and it may reset the counter.

In this case, in order to establish synchronization between voice and video even in an off-line video mail, each of the voice data and the video data may have a data structure in which time information with a frame boundary of the video used as a reference is attached as a header for every unit of a predetermined block, or a data structure in which the above both data are collectively handled by the unit of data synchronous with each other.

Further, in order to save the important resources of the baseband interface by preventing a constant connection of the counter to the baseband interface, the application processor may be also provided with a command register capable of setting a command through the baseband processor, an address register capable of setting an address signal through the baseband processor, a data register capable of reading and writing data through the baseband processor, a command decoder for decoding the command set in the command register, and an address decoder for decoding the address signal of the address register. The counter may be selected according to the decode result of the address decoder and a path capable of transferring the stored information of the counter to the data register may be selectively formed according to the decode result of the command decoder.

In order to assign the waiting time of the baseband processor to another processing, in the mobile communication terminal including an application processor used in a pair with the baseband processor, the application processor may be provided with a central processing unit for calculation processing, a counter for measuring time in the calculation processing by the central processing unit, a register of interruption parameter information readable from the baseband processor, and a digital signal processor capable of compressing and decompressing the image data transferred from a camera module. The central processing unit may instruct the digital signal processor to start the compression or the decompression of the image data for one frame, according to an interruption signal taken in from the camera module, every time of finishing each transfer of the image data for one frame from the camera module, reset the counter, set an information bit indicating that a parameter of the interruption is the reset of the counter, in the register of interruption parameter information, and transmit an interruption signal to the baseband processor.

DESCRIPTION OF THE PREFERRED EMBODIMENTS

Figure 5:
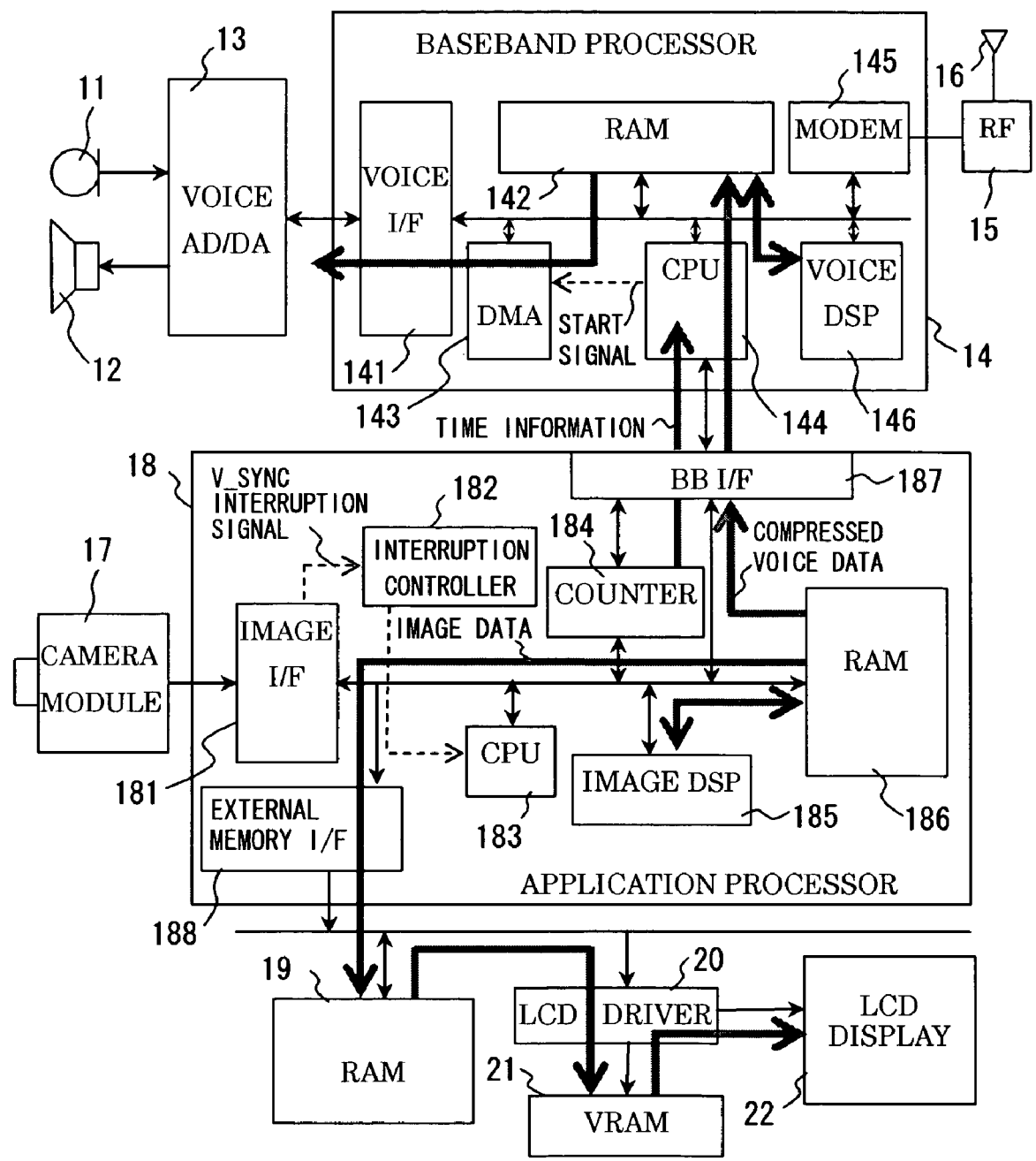
FIG. 5 is a block diagram showing a constitutional example of the whole mobile video phone.

FIG. 5 shows a mobile video phone as one example of a mobile communication terminal according to the invention. The mobile video phone shown in FIG. 5 comprises a microphone 11 (referred to as a MIC) for receiving voice, a speaker 12 for supplying voice, a sound AD/DA (analog to digital/digital to analog) converter 13 for converting the format of the sound signal, a baseband processor 14 which enables signal processing of the information exchanged by using a radio wave, an RF (Radio Frequency) circuit 15 for transmitting and receiving the radio wave of a predetermined frequency, an antenna 16 which enables the transmission and reception by the RF circuit 15, a camera module 17 for taking in a moving picture, an application processor 18 for mainly performing the video processing, a RAM (Random Access Memory) 19 for storing image data, an LCD (liquid) driver 20 for driving liquid crystal, a VRAM (Video Random Access Memory) 21 for storing the flame image to be displayed, and an LCD display 22 for displaying an image, although it is not restricted to this structure.

The baseband processor 14 has a baseband processing function which enables the exchange of the information by using the radio wave, it comprises a voice interface (I/F) 141 which enables the input/output of a voice signal, a RAM 142 for storing the data necessary for the voice data and the calculation processing, a DMA (Direct Memory Access) controller 143 which enables a direct memory access, a CPU (Central Processing Unit) 144 for performing the calculation processing according to a predetermined program, a modem 145 for performing the modulation processing and the demodulation processing of a digital signal, and a voice DSP (Digital Signal Processor) 146 for performing the voice signal processing, although it is not restricted to this structure, and it is formed on one semiconductor substrate such as a mono-crystal silicon substrate according to the well-known semiconductor integrated circuit manufacturing technique.

The application processor 18 comprises an image interface (I/F) 181 capable of taking in the image data from the camera module 17, an interruption controller 182 for requesting an interruption of a CPU 183 based on the V_Sync interruption signal from the image interface 181, the CPU (Central Processing Unit) 183 for performing calculation according to a predetermined program, a counter 184 for measuring the time in the above CPU 183, an image DSP (Digital Signal Processor) 185 for compression and decompression of the video data, a RAM (Random Access Memory) 186 for storing the voice data and the image data, a BB I/F (Baseband Interface) 187 which enables the exchange of signals with the baseband processor 14, and an external memory I/F (Interface) 188 which enables the exchange of the data with the external memory, and it is formed on one semiconductor substrate such as a mono-crystal silicon substrate according to the well-known semiconductor integrated circuit manufacturing technique.

Figure 1:
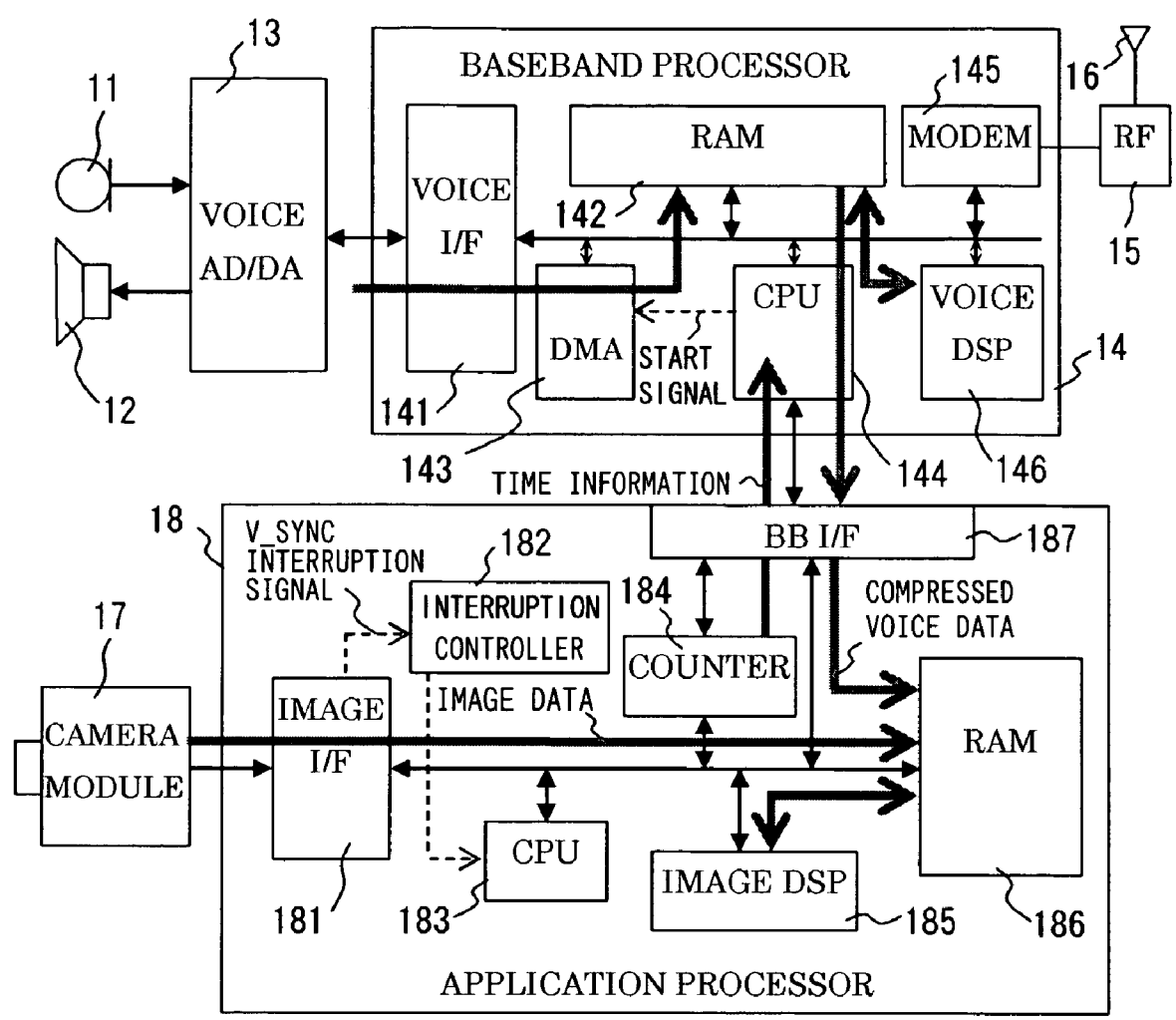
FIG. 1 is a block diagram showing a constitutional example of a main portion of a mobile video phone that is one example of a mobile communication terminal according to the invention.
Figure 2:
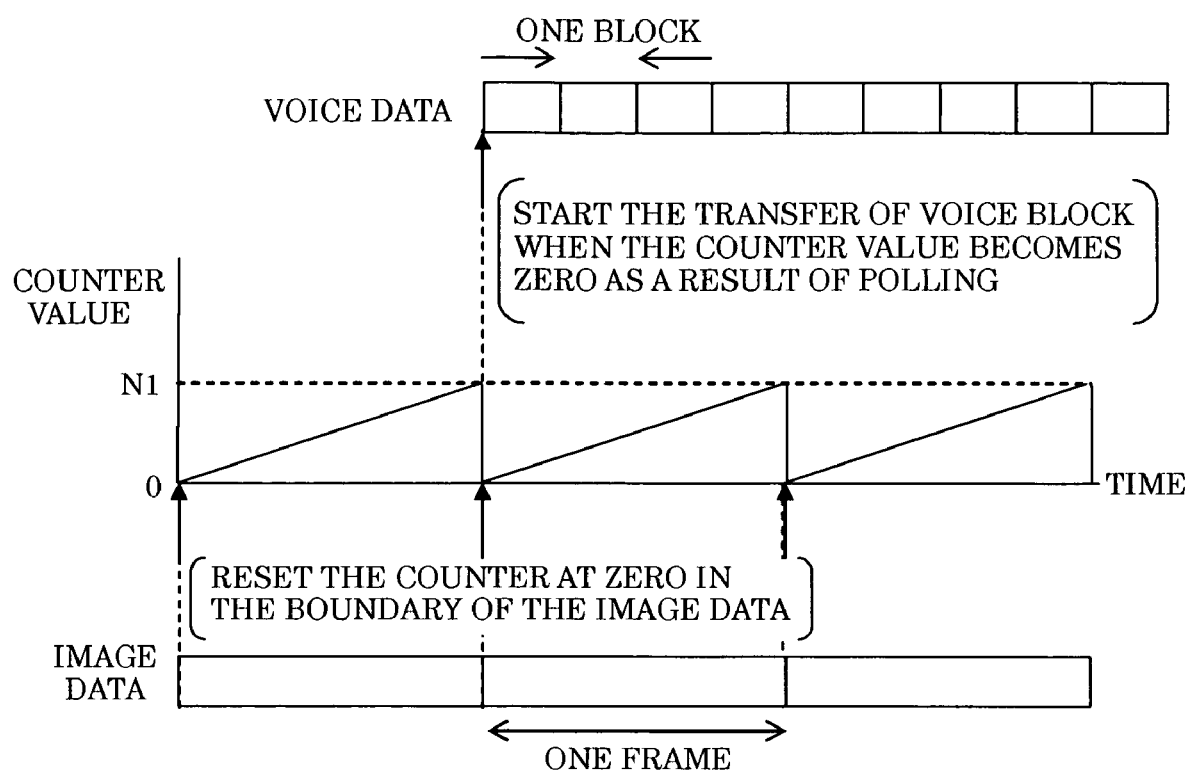
FIG. 2 is an explanatory view of the operation in the main portion at a data storing time of the above mobile video phone.

FIG. 1 shows the main portion of the above mobile video phone and a flow of data at a data storing time. FIG. 2 shows an operation timing of the main portion at this data storing time.

Since the application processor 18 is provided with the baseband interface 187 which enables the exchange of the signals with the baseband processor 14, the baseband processor 14 can read the counter 184 used for time measurement within the application processor 18.

When the power is turned on, the camera module 17 starts a memory transfer of the image data from that time, and supplies an interruption signal to the application processor 18 at every transfer of the image data for one frame to the RAM 186. The interruption from the camera module 17 is extracted by the image interface 181 and transferred to the interruption controller 182 as the V_Sync interruption signal. This interruption controller 182 requests the interruption of the CPU 183 based on the V_Sync interruption signal. The CPU 183 activates a video compression program in reply to this interruption request. By activating the video compression program, the above image data for one frame within the RAM 186 is transmitted to the image DSP 185, where it is compressed according to a predetermined algorithm. The compressed image data is again stored into the RAM 186. Through the periodical repetition of this operation, the compressed video data is formed in the RAM 186. The CPU 183 resets the counter 184 for use in the above time measurement, by the above execution of the video compression program. As illustrated in FIG. 2, though the counter 184 updates the counter output value sequentially from zero by measuring a system clock signal, when it is reset by the CPU 183, its counter output value is returned to zero. The reset of the counter 184 is caused by the V_Sync interruption signal and therefore, the output value of the counter 184 always becomes zero in the frame boundary of the image data. Therefore, by monitoring the output value of this counter 184, the frame boundary of the image data can be found.

The baseband processor 14 polls the counter 184 through the baseband interface 187 and when the output value of the counter 184 becomes zero at first, it transmits a start signal to the DMA controller 143 for voice data transfer. Thus, the DMA controller 143 transfers the voice data transmitted from the MIC 11 through the voice AD/DA converter 13 and the voice interface 141, to the RAM 142 (DMA transfer). The DMA controller 143 issues an interruption to the CPU 144 in every time of finishing the transfer for one block (generally 160 samples) that is the unit of the compression, after starting the DMA transfer of the voice data. In the baseband processor 14, scheduling of a voice compression program is periodically performed by using the interruption toward the CPU 144. The compression and decompression of the voice data is performed by the voice DSP 146. The voice data compressed by the voice DSP 146 is written into the RAM 142.

According to the above procedure, the frame boundary of the first image data can be aligned with the boundary of the first voice block, and the image can be synchronized with the voice. Namely, the starting time of the image frame compressed first can be synchronized with that of the voice block. The above boundary of the video frame is defined as a synchronous point and the both processors start the input/output processing as well as the compression/decompression processing, respectively as for the video data and the voice data, hence to establish synchronization in an on-line mobile video phone. The compression voice data within the RAM 142 is written into the RAM 186 through the baseband interface 187. Then, by the CPU 183, the compressed voice data and the compressed video data within the RAM 186 are multiplexed, transmitted to the RAM 142 within the baseband processor 14, and it is modulated by the modem 145 and transmitted to the other party through the RF circuit 15.

Figure 3:
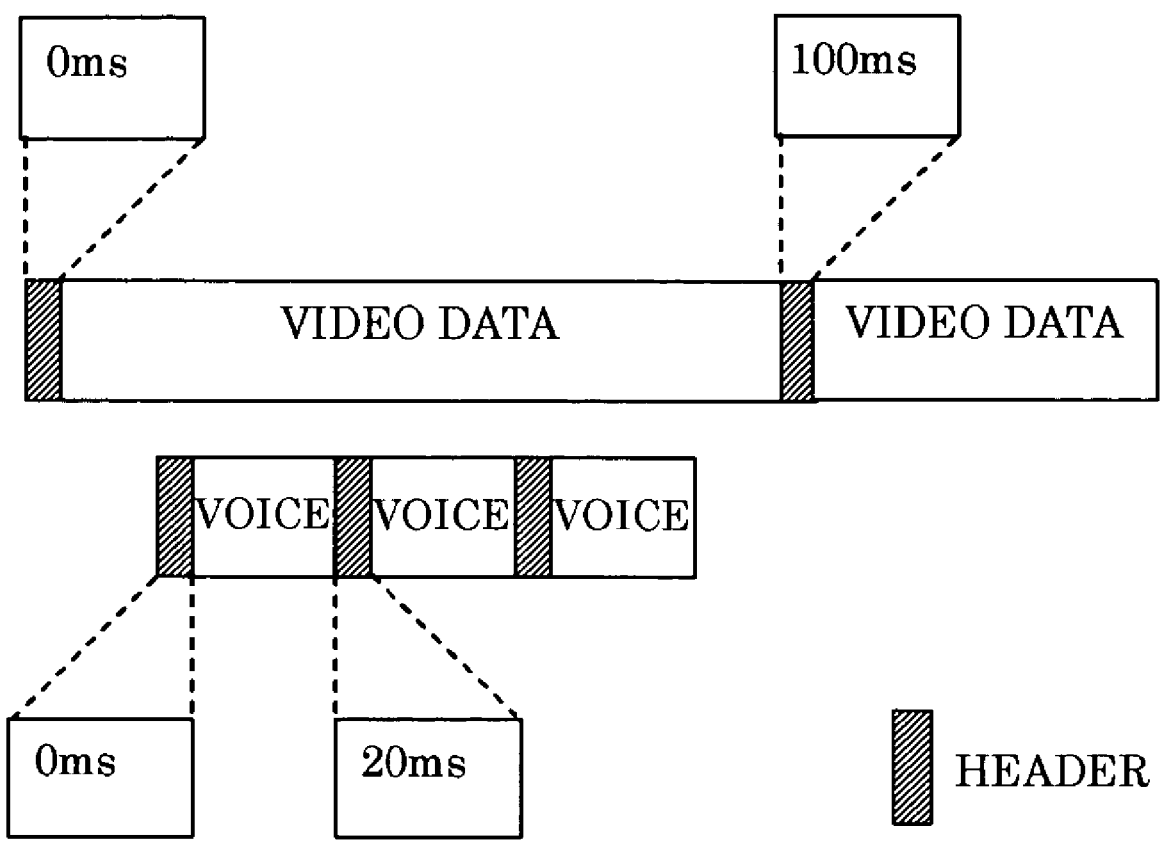
FIG. 3 is an explanatory view of the data format to be handled by the above mobile video phone.

By attaching the information of the absolute time or the record time (starting timing) with the above frame boundary used as a reference to the block of the compressed video data and the compressed voice data, synchronization can be established between the voice and the video even in an off-line video mail. Namely, as illustrated in FIG. 3, a header is added to the head of each block of the video data and a staring timing from the reference point as for the following video data is shown in this header. For example, when the header information is 100 ms, the following video data starts after 100 ms from the head video data. Similarly, a header is added to the head of each block of the voice data, and the staring timing of the continuous voice data is shown in this header. Thus, by attaching the information of the absolute time or the record time with the above frame boundary used as a reference point to each block of the compressed video data and the compressed voice data, video and voice can be reproduced based on the time information of the headers in an off-line video mail.

Figure 4:
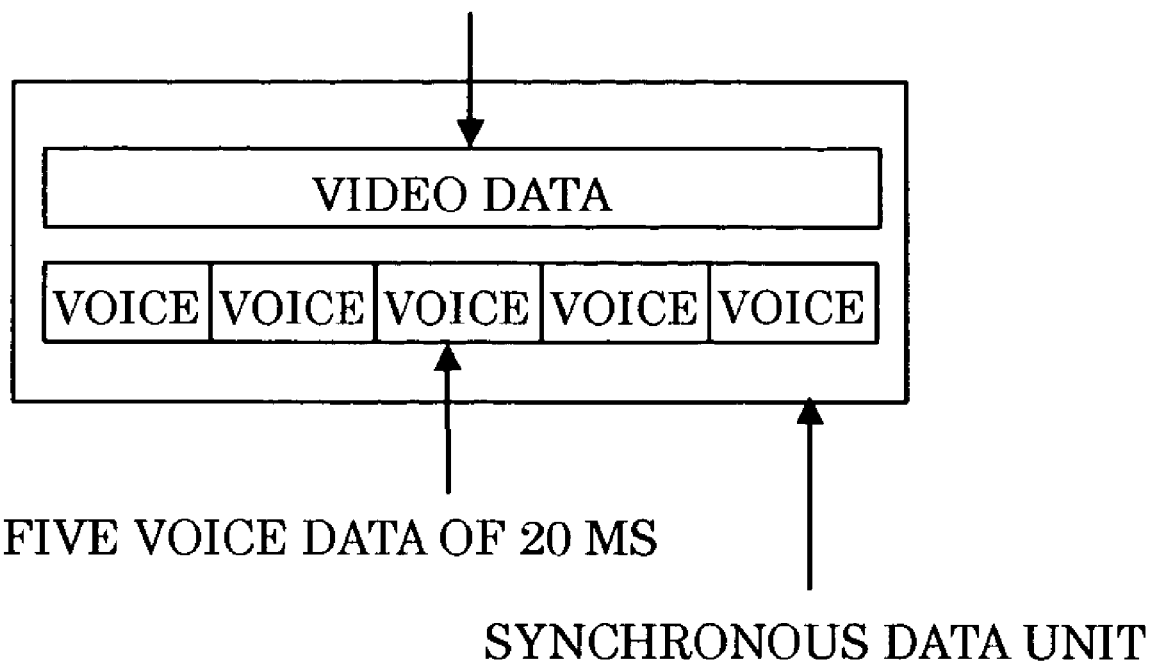
FIG. 4 is an explanatory view of the data format to be handled by the above mobile video phone.

Further, as illustrated in FIG. 4, by collectively handling the compressed data by the unit of synchronous data of video and voice, synchronization can be established between video and voice even in an off-line video mail. In the example shown in FIG. 4, the video data for 100 ms (one frame in 10 fps) and five voice data for 20 ms are collectively transferred as the unit of the synchronous data. At an off-line reproducing time, for example, synchronization can be established therebetween by reproducing five voice data for 20 ms per one video data for 100 ms.

The reproducing operation of the video and the voice will be described with reference to FIG. 5 and FIG. 6.

Figure 6:
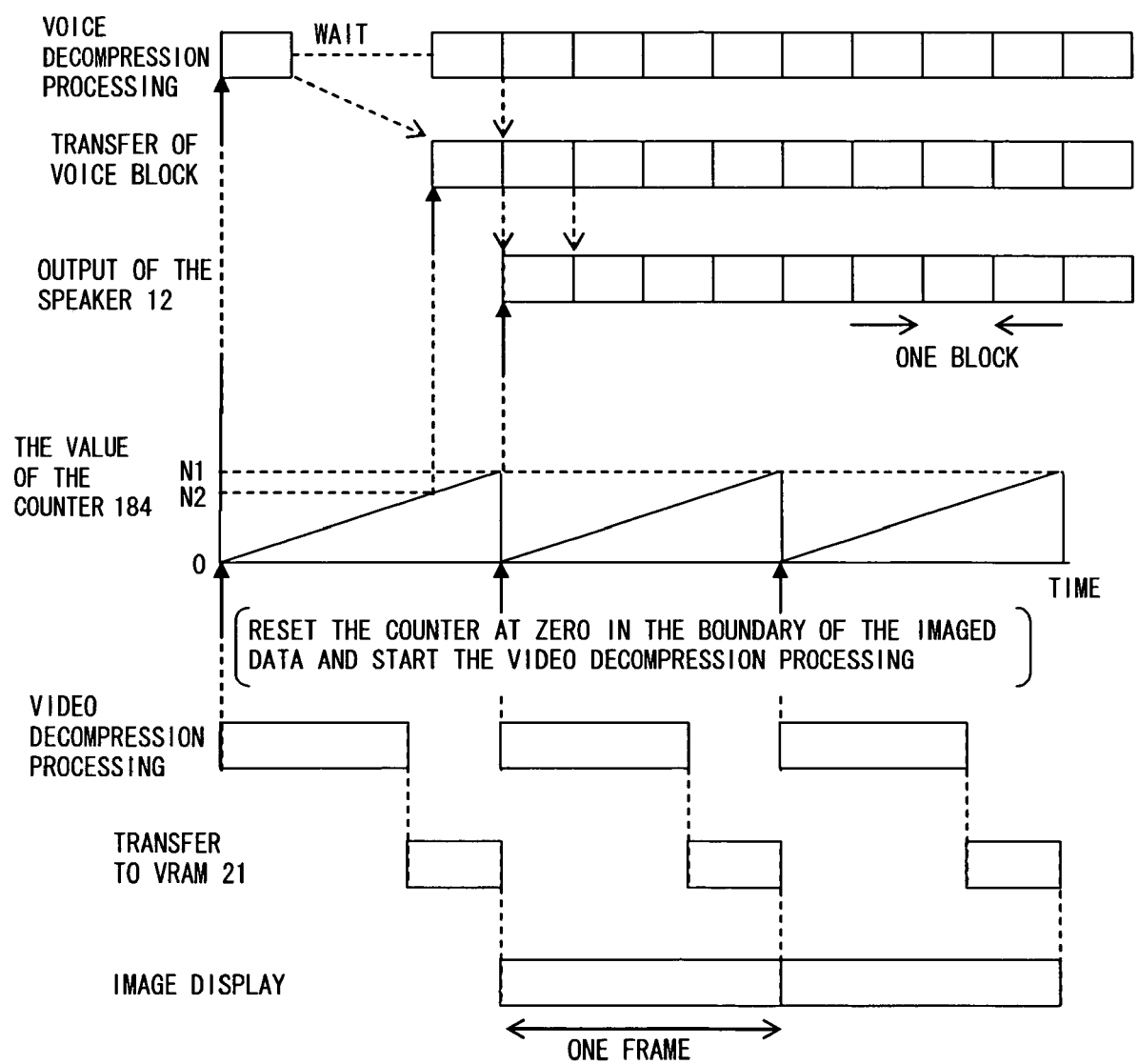
FIG. 6 is an explanatory view of the operation when an image and a voice are reproduced in the above mobile video phone.
Figure 7:
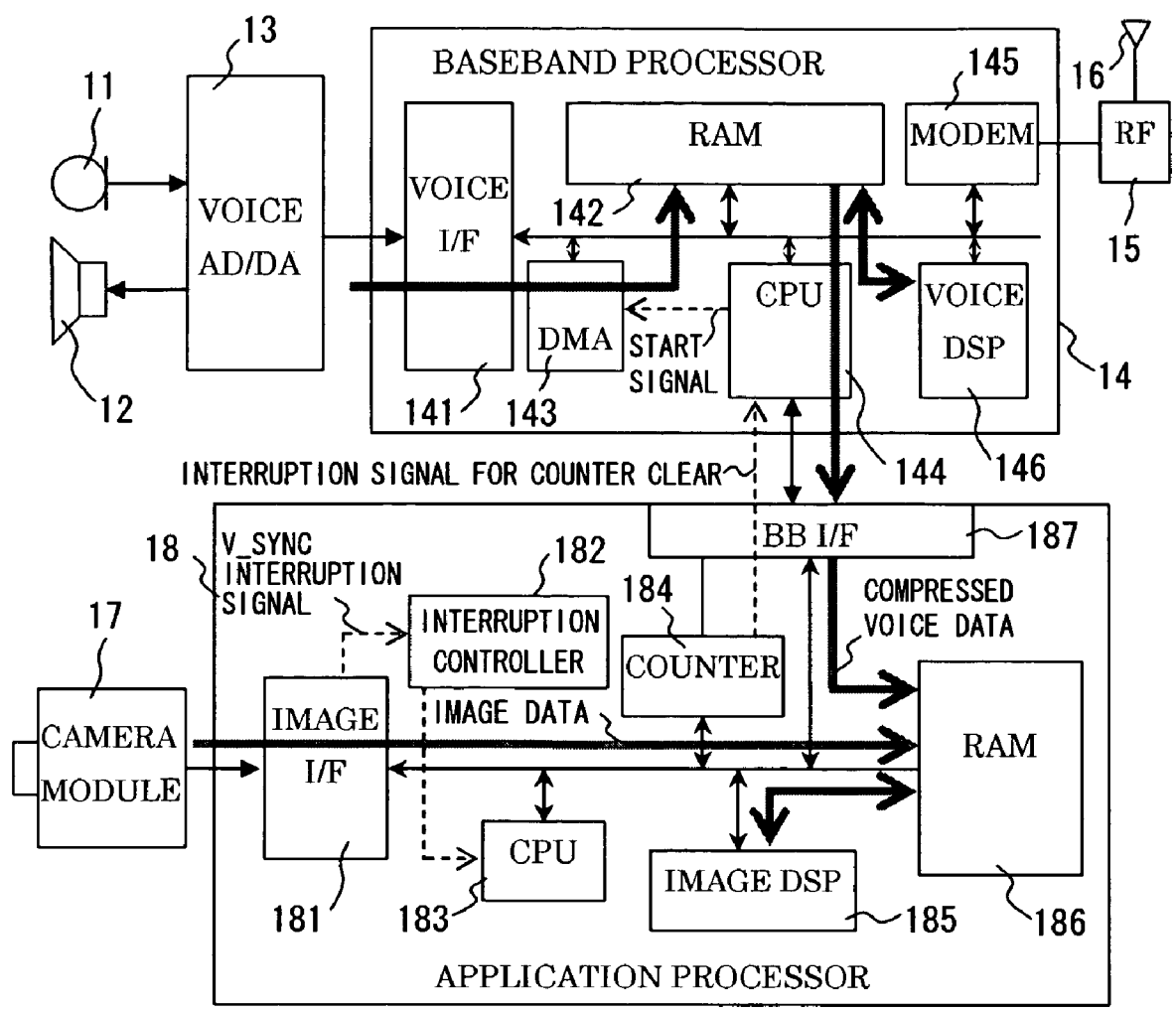
FIG. 7 is a block diagram showing another constitutional example of a main portion in the above mobile video phone.

FIG. 5 shows a flow of the data at a reproducing time and FIG. 6 shows the operation timing of the main portion at the reproducing time.

The multiplexed data is transmitted through the RF circuit 15 and received by another mobile video phone. Namely, in another mobile video phone, it is received through the RF circuit 15, demodulated by the modem 145, and stored into the RAM 186 through the baseband interface 187.

When the power is turned on, the camera module 17 starts a memory transfer of the image data from that point and interrupts the application processor 18 every time of completing each transfer of the image data for one frame. The video is reproduced in synchronization with this interruption.

The application processor 18 activates a video reproducing program by using the above interruption signal and decompresses the image data for one frame within the RAM 186. This decompression is performed by the image DSP 185. The decompressed image data is written into the VRAM (Video Random Access Memory) through the external RAM 19. This operation will be periodically repeated.

The application processor 18 resets the counter 184 for use in the time measurement, in the video playback mode of the interruption processing of the first image frame. This always makes the counter 184 zero in the frame boundary of the following image data, and the baseband processor 14 can know the frame boundary of the image data by monitoring this counter 184.

The application processor 18 is activated in the frame boundary of the image data at the point when the above counter 184 first becomes zero. The reproduced video data is displayed on the LCD display 22 at the point when the counter 184 secondarily becomes zero.

When the application processor 18 comes into the video playback mode, the baseband processor 14 receives the compressed voice data from the RAM 186 through the baseband interface 187.

As illustrated in FIG. 6, the baseband processor 14 polls the counter 184 through the baseband interface 187, performs only one processing of voice decompression when the counter 184 first becomes zero, and turns into a wait state. The decompressed voice block is stored in the RAM 142.

The baseband processor 14 polls the counter 184 continuously and waits until the output value of the counter 184 becomes "N2". When the output value of the counter 184 becomes "N2", a start signal is transmitted to the DMA controller 143 for voice data transfer. The DMA controller 143 starts transferring the voice data and generates an interruption every time of completing each transfer of one block (generally 160 samples) that is the unit of the decompression processing. In the baseband processor 14, scheduling of the voice decompression program is periodically performed by using this interruption. The "N2" is the counter value at the time dating back to by the time for voice block from the image frame boundary where the video starts.

The baseband processor 14 polls the counter 184 continuously and releases the mute of the speaker 12 when the output value of the counter 184 becomes zero secondarily.

The first decompressed voice block has been completely transferred at this time and the voice output starts from the speaker 12.

According to the above procedure, the frame boundary of the first image data can be aligned with the boundary of the first voice block at a reproducing time, hence to establish synchronization between the image and the voice. Namely, it is possible to equalize the starting timings of the image frame to be displayed first and the voice block to be supplied first.

According to the above example, the following functions and effects can be obtained.

(1) The baseband processor can read the counter by providing the CPU 183 for calculation processing, the counter 184 which enables the time measurement in the calculation processing of the above CPU 183, and the baseband interface 187 which enables the baseband processor 14 to read the counter 184. Therefore, since the processing by the baseband processor can be synchronized with the processing by the CPU 183, it is possible to establish synchronization between video and voice when the video processing and the voice processing are separately performed by the different processors.

(2) As illustrated in FIG. 3, by attaching the information of the absolute time or the record time (starting timing) with the above frame boundary used as a reference point, to the block of the compressed video data and the compressed voice data, it is possible to establish synchronization between voice and video even in an off-line video mail.

(3) As illustrated in FIG. 4, even when collectively handling the compressed data by the synchronous data unit of video and voice, synchronization can be established between the video and the voice in an off-line video mail.

As mentioned above, although the invention made by the present inventor has been described concretely, the invention is not restricted to the above, but it is needless to say that various modifications can be made without departing from its spirit.

For example, a counter clear interruption can be added to the interruption caused by the application processor 18 to the baseband processor 14. The information bit indicating that the interruption parameter is the counter clear is to be read out from the application processor 18 through the baseband interface 187.

Similarly to the above example, the camera module 17 starts a memory transfer of the image data as soon as the power is turned on and interrupts the application processor 18 every time of completing each transfer of the image data for one frame. The application processor 18 activates a video compression program by using the above interruption signal and compresses the captured image data for one frame. This operation will be repeated. The application processor 18 resets the counter 184 during the above interruption, sets the information bit indicating that the interruption parameter is the counter reset, in a predetermined register in the baseband interface 187 as well as transmits an interruption signal to the baseband processor 14. The interrupted baseband processor confirms the information bit indicating that the above interruption parameter is the counter reset, through the baseband interface 187, and transmits a start signal to the DMA 143 in order to transfer the voice data block. The operations thereafter are the same as those of the above example. Since this example uses the interruption instead of polling as mentioned in the above example, the waiting time of the baseband processor can be used for another processing effectively.

Figure 8:
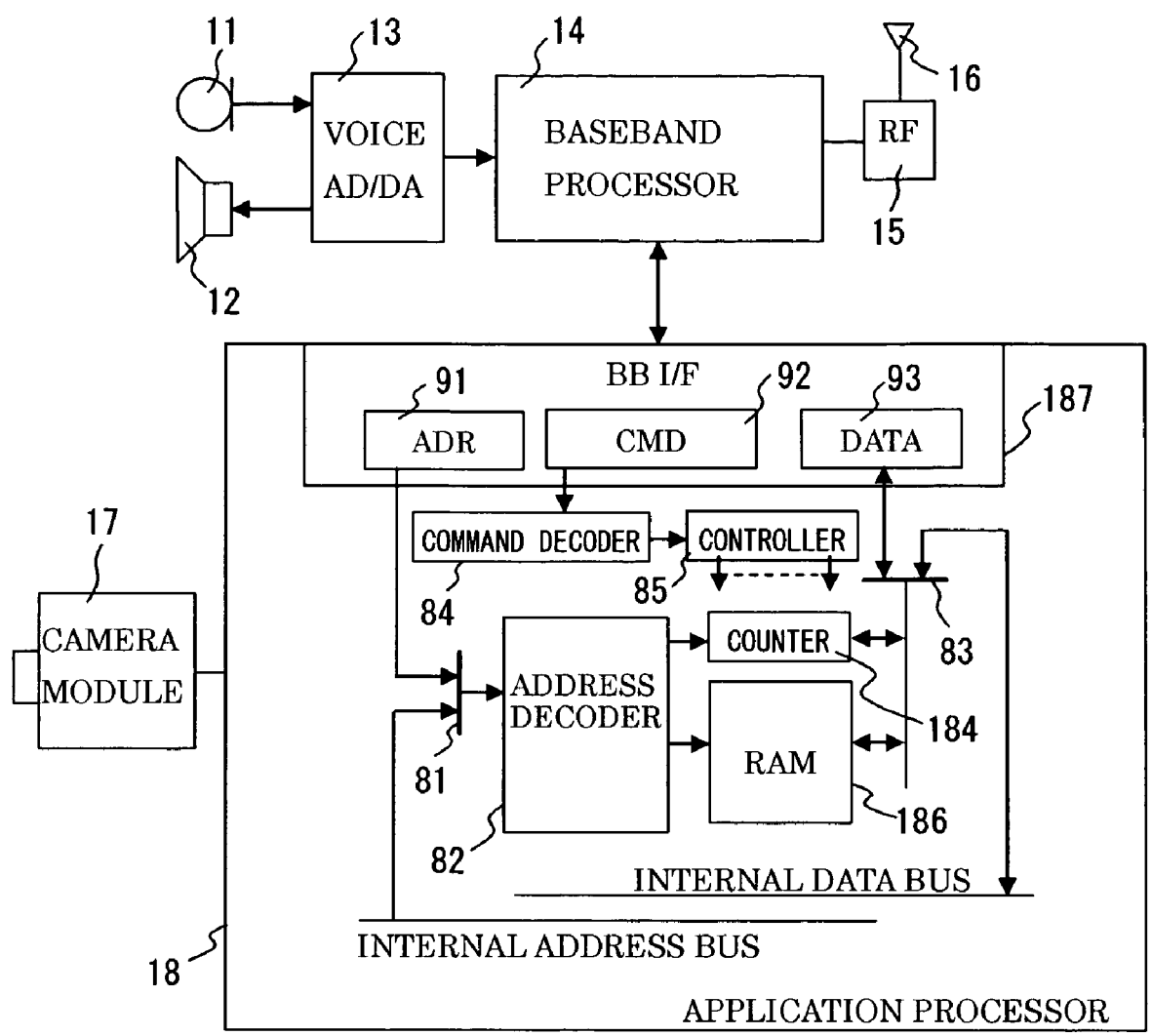
FIG. 8 is a block diagram showing another constitutional example of a main portion in the above mobile video phone.

FIG. 8 shows the constitutional example of the main portion when the baseband interface 187 gains an indirect access to the counter 184 for use in the time measurement.

According to this structure, since it is not necessary to always monitor the output value of the counter 184, the important resources of the baseband interface 187 can be saved. The baseband interface 187 gains access to the counter 184 and the RAM 186 that are the common resources by using three registers, that are, an address (ADR) register 91, a command (CMD) register 92, and a data (DATA) register 93. The baseband processor 14 can gain a direct access to the three registers 91 to 93 in the baseband interface 187. The above counter 184 and the RAM 186 are assigned in the address space managed by the CPU 183. A selector 81 selectively transmits the output value of the address register 91 or the value of the internal address bus to an address decoder 82. The address decoder 82 generates a signal for gaining access to the counter 184 and the RAM 186 by decoding the address signal transmitted through the selector 81. A selector 83 selectively combines the data register 93 or the internal data bus with the counter 184 or the RAM 186. A command decoder 84 for decoding the command supplied from the command register 92 and a controller 85 for controlling the read/write operation of the counter 184 and the RAM 186 and the operations of the selectors 81 and 83 according to the output signal of the command decoder 84 are provided within the application processor 18.

The procedure of gaining access to the counter 184 from the baseband processor 14 will be described.

At first, the address of the counter 184 is written into the address register 91. Continuously, a read command is written into the command register 92. This read command is decoded by the command decoder 84 and based on the decode result, the controller 85 generates an operation control signal of each unit. Thus, the address signal of the address register 91 is transmitted to the address decoder 82 through the selector 81. The counter 184 is combined with the data register 93 through the selector 83 and the contents of the counter 184 are transmitted to the data register 93 through the selector 83. The data register 93 can be accessed directly by the baseband processor 14 and accordingly, the counter 184 can be accessed directly by the baseband processor 14. When the address of the RAM 186 is set in the address register 91, the information can be read out from the RAM 186. Further, when a write command is set in the command register, the information can be written into the counter 184 and the RAM 186. When the application processor 18 gains an internal access to the counter 184 and the RAM 186, an internal address bus is combined with the address decoder 82 through the selector 81 and combined with the counter 184 and the RAM 186 through the internal bus selector 83.

The counter 184 can be reset by writing zero into the above counter 184.

This time, the resolution of synchronization according to the indirect access method shown in FIG. 8 will be considered. Since the image frame is 30 Hz and the voice sample is 8 Hz at best, the intervals of the voice sample are improper. Accordingly, it is necessary to estimate the degree of the overhead of synchronization processing compared with the intervals of the voice sample. The operation frequency of the baseband interface 187 is generally about 20 MHz. Accordingly, there exist 20 MHz/8 kHz=2500 cycles as for one voice sample. The overhead of the synchronization processing is estimated as some tens cycles because of only checking zero by monitoring the counter 184 and only activating the DMA controller 143. The overhead time of the synchronization processing becomes about $1/100$ of the interval of a voice sample and accordingly, it is clear that there is no problem if adopting the indirect access method shown in FIG. 8.

Although the above description has been made in the case where the invention made by this inventor is used for a mobile video phone that is an applicable field in the background, the invention is not restricted to this, but it can be widely used for various kinds of mobile communication terminals.

The invention can be used under the condition of at least exchanging information.

The effects obtained by the typical example of the invention disclosed in this specification will be briefly described as follows.

Namely, since the baseband processor can read the counter, the processing in the baseband processor can be synchronized with the processing in the central processing unit in the microprocessor, and therefore, it is possible to establish synchronization between video and voice easily even when the video processing and the voice processing are separately performed by the different processors.

What is claimed is:

1. A microprocessor combined with and used in a pair with a baseband processor for performing baseband processing which enables exchange of information by using radio waves, comprising:

a central processing unit for calculation processing;

a counter for measuring time in the calculation processing by the central processing unit;

an interface which enables the baseband processor to read the counter; and a digital signal processor capable of compressing and decompressing image data transferred from a camera module, wherein the central processing unit instructs the digital signal processor to start the compression or the decompression of image data for one frame, according to an interruption signal from the camera module, every time of finishing each transfer of the image data for one frame from the camera module, and resets the counter.

2. The microprocessor according to claim 1, further comprising:

a memory for storing voice data compressed by the baseband processor and taken in through the interface and video data compressed by the digital signal processor, wherein each of the voice data and the video data has a data structure in which time information with a frame boundary of the video used as a reference is attached as a header for every unit of a predetermined block.

3. The microprocessor according to claim 1, further comprising:

a memory for storing voice data compressed by the baseband processor and taken in through the interface and video data compressed by the digital signal processor, wherein the voice data and the video data have a data structure in which the voice data and the video data are collectively handled in units of synchronous data.

4. The microprocessor according to claim 1, further comprising:

a command register capable of setting a command through the baseband processor;

an address register capable of setting an address signal through the baseband processor;

a data register capable of reading and writing data from the baseband processor;

a command decoder for decoding the command set in the command register; and an address decoder for decoding the address signal of the address register, wherein the counter is selected according to the decode result of the address decoder, and a path capable of transferring stored information of the counter to the data register is selectively formed according to the decode result of the command decoder.

5. A microprocessor combined with and used in a pair with a baseband processor for performing baseband processing which enables exchange of information by using radio waves, comprising:

a central processing unit for calculation processing;

a counter for measuring time in the calculation processing by the central processing unit;

a register of interruption parameter information readable from the baseband processor; and a digital signal processor capable of compressing and decompressing image data transferred from a camera module, wherein the central processing unit instructs the digital signal processor to start the compression or the decompression of image data for one frame, according to an interruption signal from the camera module, every time of finishing each transfer of the image data for one frame from the camera module, resets the counter, sets an information bit indicating that a parameter of the interruption is reset of the counter, in the register of interruption parameter information, and transmits an interruption signal to the baseband processor.

6. A mobile communication terminal comprising:

a baseband processor for performing baseband processing which enables exchange of information by using radio waves and an application processor combined with and used in a pair with the baseband processor;

a camera module for obtaining video data; and a digital signal processor capable of compressing and decompressing the video data transferred from the camera module, wherein the application processor includes a central processing unit for calculation processing, a counter for measuring time in the calculation processing by the central processing unit, and an interface which enables the baseband processor to read the counter, and wherein the central processing unit instructs the digital signal processor to start the compression or the decompression of the video data for one frame, according to an interruption signal from the camera module, every time of finishing each transfer of the video data for one frame from the camera module, and resets the counter.

7. The mobile communication terminal according to claim 6, wherein the application processor comprises a memory for storing voice data compressed by the baseband processor and taken in through the interface and the video data compressed by the digital signal processor, and wherein each of the voice data and the video data has a data structure in which time information with a frame boundary of the video used as a reference is attached as a header for every unit of a predetermined block.

8. The mobile communication terminal according to claim 6, wherein the application processor comprises a memory for storing voice data compressed by the baseband processor and taken in through the interface and the video data compressed by the digital signal processor, and wherein the voice data and the video data have a data structure in which the voice data and the video data are collectively handled in units of synchronous data.

9. The mobile communication terminal according to claim 8, wherein the application processor further comprises a command register capable of setting a command through the baseband processor, an address register capable of setting an address signal through the baseband processor, a data register capable of reading and writing data through the baseband processor, a command decoder for decoding the command set in the command register, and an address decoder for decoding the address signal of the address register, and wherein the counter is selected according to the decode result of the address decoder, and a path capable of transferring stored information of the counter to the data register is selectively formed according to the decode result of the command decoder.

10. A mobile communication terminal comprising:

a baseband processor for performing baseband processing which enables exchange of information by using radio waves; and an application processor combined with and used in a pair with the baseband processor, wherein the application processor comprises a central processing unit for calculation processing, a counter for measuring time in the calculation processing by the central processing unit, a register of interruption parameter information readable from the baseband processor, and a digital signal processor capable of compressing and decompressing image data transferred from a camera module, and wherein the central processing unit instructs the digital signal processor to start the compression or the decompression of the image data for one frame, according to an interruption signal from the camera module, every time of finishing each transfer of the image data for one frame from the camera module, resets the counter, sets an information bit indicating that a parameter of the interruption is reset of the counter in the register of interruption parameter information, and transmits an interruption signal to the baseband processor.

* * * * *